May 17, 1955   H. G. ALLEN ET AL   2,708,394
SHEET GUIDING APPARATUS FOR TUBE FORMING MACHINES
Filed Jan. 21, 1950   8 Sheets-Sheet 1

Fig. 1.

INVENTORS
Howard G. Allen
Charles D. Thomas
BY
Pennie, Edmonds, Morton and Barrows
Attorneys.

Fig. 2.

May 17, 1955          H. G. ALLEN ET AL          2,708,394
SHEET GUIDING APPARATUS FOR TUBE FORMING MACHINES
Filed Jan. 21, 1950          8 Sheets-Sheet 4

INVENTORS
Howard G. Allen
Charles D. Thomas
BY
Attorneys.

INVENTORS
Howard G. Allen
Charles D. Thomas
BY
Jenner, Edmonds, Morton and Barrows
Attorneys.

May 17, 1955 H. G. ALLEN ET AL 2,708,394
SHEET GUIDING APPARATUS FOR TUBE FORMING MACHINES
Filed Jan. 21, 1950 8 Sheets-Sheet 8

INVENTORS
Howard G. Allen
Charles D. Thomas
BY
Pennie Edmonds Morton and Barrows
Attorneys.

United States Patent Office 2,708,394
Patented May 17, 1955

2,708,394

SHEET GUIDING APPARATUS FOR TUBE FORMING MACHINES

Howard G. Allen, Niagara Falls, and Charles Dellinger Thomas, Hamburg, N. Y., assignors to Daystrom, Incorporated, a corporation of New Jersey Application January 21, 1950, Serial No. 139,828

2 Claims. (Cl. 93—81)

This invention relates to apparatus for feeding sheet material from a roll and delivering sheets of predetermined length and width to machines on which further operations are to be performed on the sheets.

In our prior applications Serial Nos. 586,344, filed April 3, 1945, now Patent No. 2,509,714, and 625,762, filed October 31, 1945, now Patent No. 2,509,715, we have disclosed and claimed methods of and apparatus for forming tubular bodies from sheets of foil, paper or the like, coated with a thermoplastic resin. In the methods and apparatus disclosed in such applications, the sheets are delivered to a mandrel, wound upon the mandrel, preferably in a two-ply wrapping, the tubular body thus formed placed in a die and heated air delivered to the interior of the tubular body within the die to form the tube. In forming tubes in this manner, the sheets fed to the machine must be of predetermined size as one dimension of the sheet determines the height of the tube and the other dimension must be equal to a multiple of the circumference of the tube. While the apparatus forming the subject matter of the present invention is capable of use in any situation where sheets of a predetermined length and width are to be fed from a roll of sheet material, it will be described in connection with tube forming apparatus of the character referred to above.

In carrying out the invention, we provide a roll from which the sheet material is fed, together with cutting rollers or side trimmers to trim the sheet material to the desired width. We further provide means for shifting the roll laterally to properly align the printing matter on the cut sheets. This is preferably accomplished by means of a photoelectric cell controlling a motor through which the reel on which the roll of foil or other material is mounted may be adjusted laterally of the machine.

The sheets of foil must not only be of proper dimensions but the printing matter appearing thereon must be properly registered with the shearing means so that it will appear in the proper place on the tube. For this purpose we provide a second photo-electric cell connected to a solenoid operated brake which regulates the feed of the material. The feed of the material is intermittent and this brake is also actuated through a cam controlled switch during the interruption of the feed.

The drive of the feed mechanism is adjustable to permit feeding of sheets of different lengths. Part of the mechanism is pivotally mounted on the tube forming machine to permit proper positioning of the edges of the sheets with respect to the mandrels of the tube making machine for varying lengths of cut sheets.

In the accompanying drawings we have shown one embodiment of the invention. In this showing.

As set forth in application, Serial No. 625,762, the bonding machine includes a pair of mandrels 2 (see Fig. 12), an aligned pair of fusing nozzles 4 and a movable carriage 6. The carriage is provided with two circular dies 8 aligned with the mandrels and the fusing nozzles. The carriage is reciprocated by means of a cam drum 10 and a lever 12 having a follower (not shown) received in a cam track (not shown) on cam 10 to reciprocate the carriage. In a cycle of operation starting with the carriage in the center position shown in Fig. 1, the sheet material is first wound on the mandrels, the carriage reciprocated to the right in Fig. 1 over the mandrels to receive the coiled sheet material, then reciprocated to the left over the fusing nozzles. While the carriage is passing over the fusing nozzles, heated air is delivered from the nozzles to cause the sheet material to conform to the wall of the cavities 8 and to fuse the two layers of material to each other. The carriage then returns to the intermediate position.

The sheet feeding mechanism forming the subject matter of the present invention includes a base 14 on which a pair of upright members 16 are pivotally mounted. The lower ends of these members are pivoted on shaft 18 which constitutes the main shaft of the feeding mechanism. This shaft is provided with a sprocket (see Fig. 4) over which passes a chain 22, the chain 22 also passing over the cam shaft 24 of the bonding machine. The upper ends of the upright members 16 are connected to each other by a cross member 26. The pivoted frame may be adjusted toward or away from the bonding machine by means of a turn buckle 28 connected to a bracket 30 on the frame and to a bracket 32 on the bonding machine.

*Sheet supply and feed*

The material M, from which the sheets are to be formed, is supplied in rolls R and mounted in the machine on a spindle 34. The material may be a thermoplastic film, paper, metal foil or other sheet material coated or impregnated with a thermoplastic or thermosetting resin by means of which the layers of the material will be bonded to each other in the bonding machine. It is supplied of a slightly greater width than the height of the embryo tubes to be produced in the bonding machine.

The spindle 34 is provided with a pair of spools 36 which may be adjusted toward and away from each other to accommodate rolls of different sizes and these spools are provided with tapered heads 38 which are received in the hollow core of the roll R. The spindle is supported in bearing members 40 having substantially semi-circular recesses in their upper faces for the reception of the spindle. At one end (see Fig. 3) a locking member 42 is placed over the spindle and locked in place by bolt 44 and wing nut 46. The member 42 acts as a snubbing brake to prevent over-feed of material from the roll and thus maintains a taut web. At the other end, the spindle is provided with a groove 48 to receive a key or pin 50 carried by the bearing member 40 to position the roll with respect to the spindle. The bearing members are carried by brackets 52 mounted on a plate or base 54. This plate or base is movably mounted on the base 14 of the machine and its side edges are received in guide ways 56. Depending from it (see Fig. 2) are a pair of lugs 58 having threaded openings therein to receive a threaded shaft 60. A gear 62 is mounted on the shaft 60 and this gear meshes with a pinion 64 of the shaft of motor 66. Thus, when the motor is energized, by means to be hereinafter described, the spindle 34 and the roll are adjusted laterally to maintain the side registry of the cut sheets.

The material from roll R is fed upwardly and rearwardly over tension roll 68 (see Fig. 3), then upwardly and forwardly over guide roll 70. The roll 70 is carried by a pair of arms 72 supported by brackets 52 at their lower ends. The roll 68 is mounted on a shaft 74 carried by a pair of rods 76 which are pivotally mounted on shaft 78 of the roll 70. A spring (not shown) is connected to the shaft 74 and to the frame work of the machine to place the fed material M under proper tension.

*Edge trimming mechanism*

Figure 1:
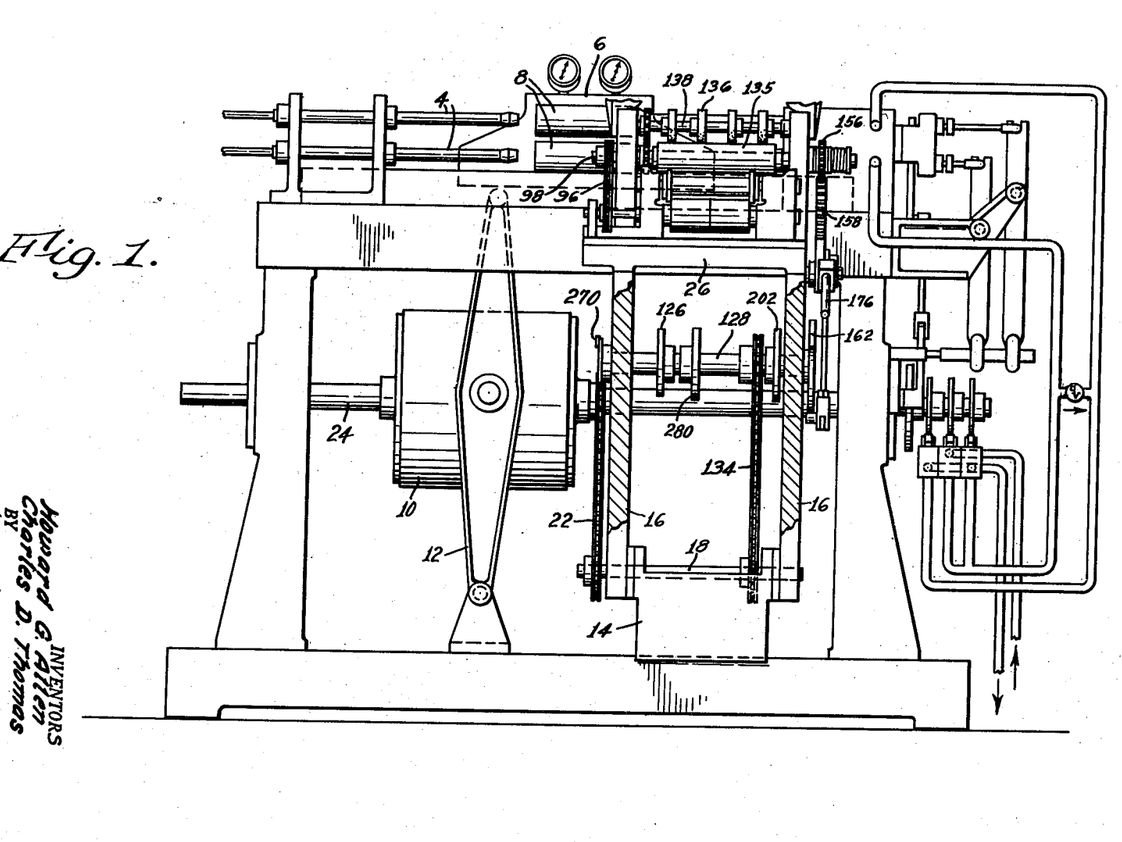
Fig. 1 is a front elevation of the bonding machine of application, Serial No. 625,762 showing the feed mechanism assembled therewith, parts being shown in section.
Figure 2:
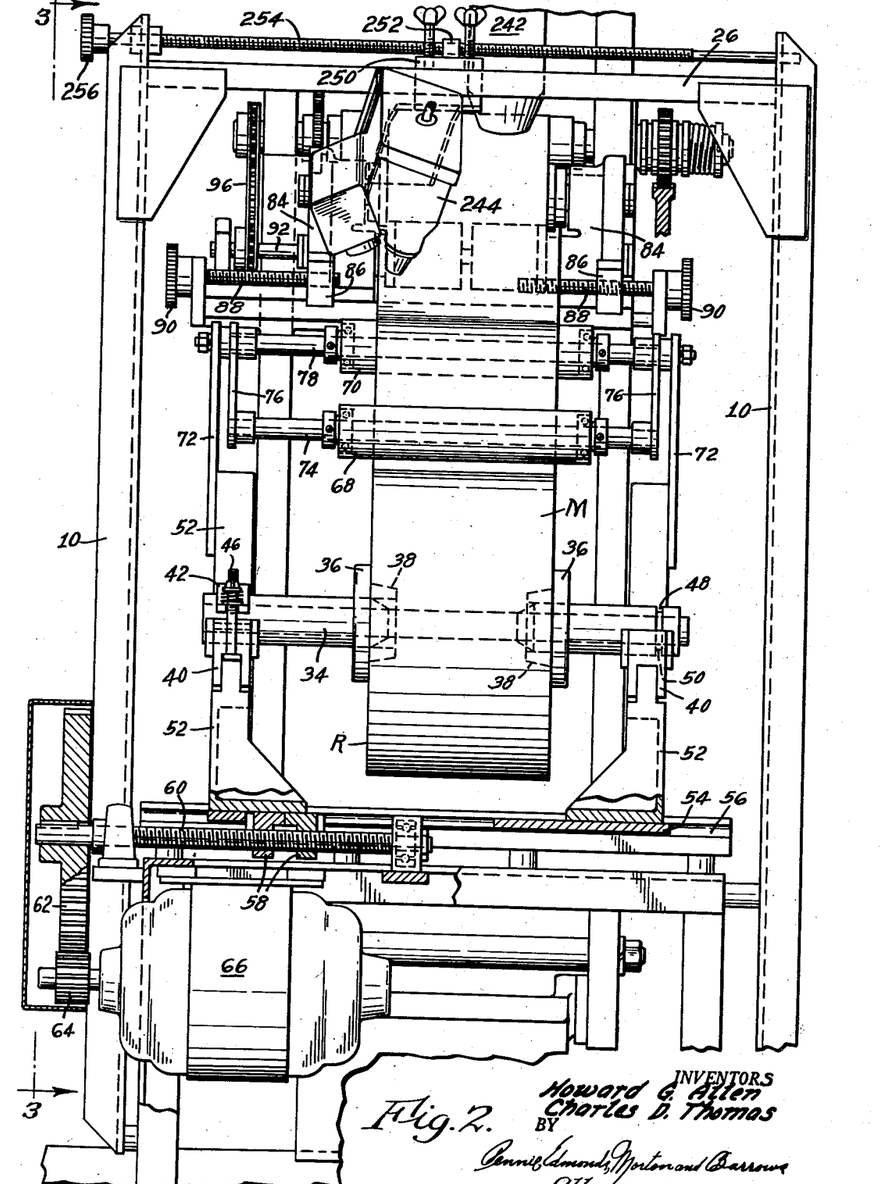
Fig. 2 is a front elevation on a larger scale of the feed mechanism.
Figure 3:
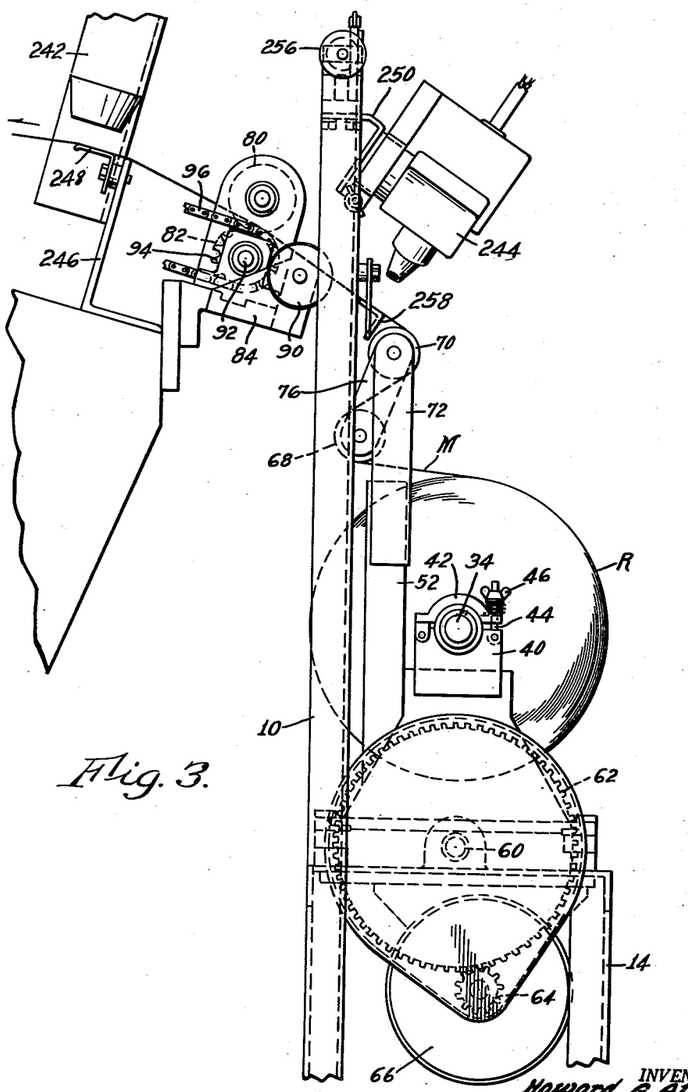
Fig. 3 is a side elevation of the feed mechanism on line 3—3 of Fig. 2.

From the guide rolls the material M passes between the edge or side trimming mechanism (see Figs. 2 and 3). The side trimmers consist of upper and lower circular cutters 80 and 82. They are mounted in frames 84 and these frames are provided with ears 86 having threaded openings for the reception of threaded adjusting rods 88. The ends of these rods are provided with hand wheels 90 and when the machine is first set up to produce tubes of a given size, the side trimmers are adjusted to the proper distance from each side. The lower members of the side trimmers are mounted on a shaft 92 and this shaft is provided with a sprocket 94 which receives a chain 96. This chain passes over a sprocket on the shaft 98 of the lower feed roll (see Figs. 1 and 2).

*Sheet cutting mechanism*

Figures 4, 5:
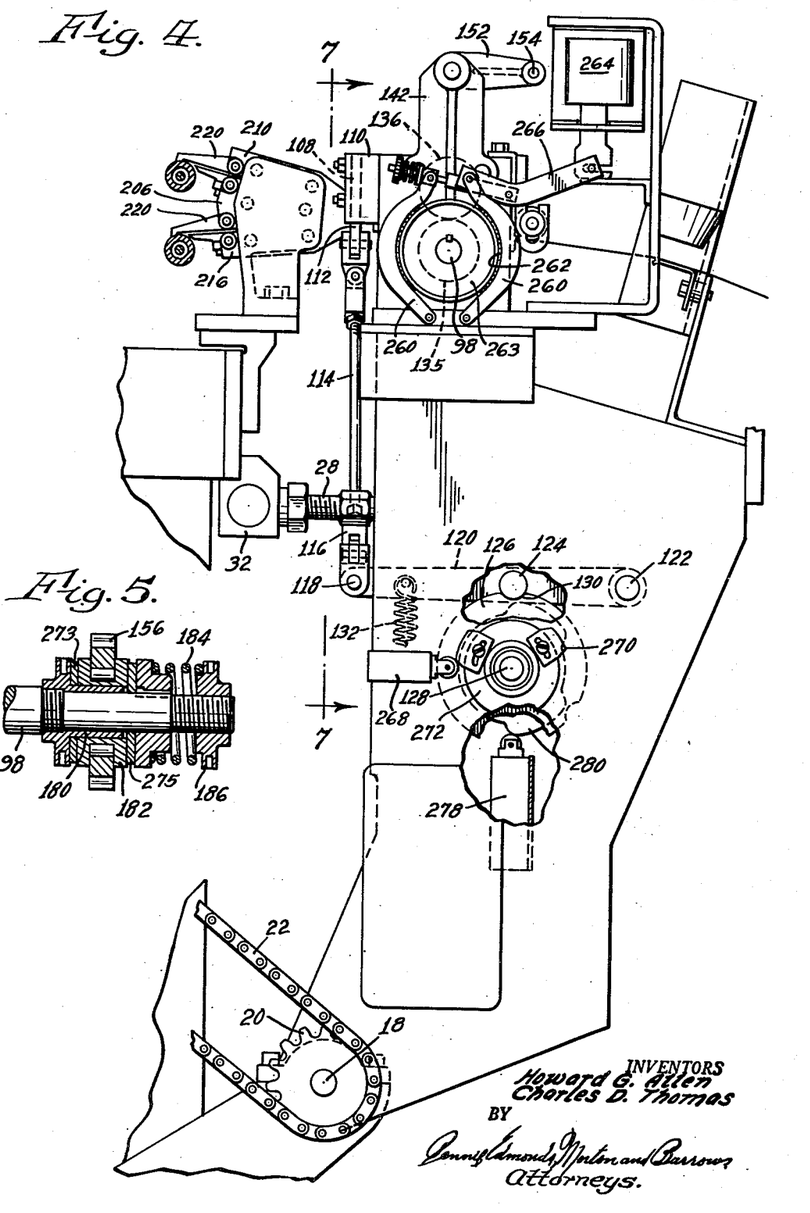
Fig. 4 is a side elevation, parts being shown in section.
Fig. 5 is a detailed, sectional view of the clutch on the feed roller shaft.
Figures 7, 8:
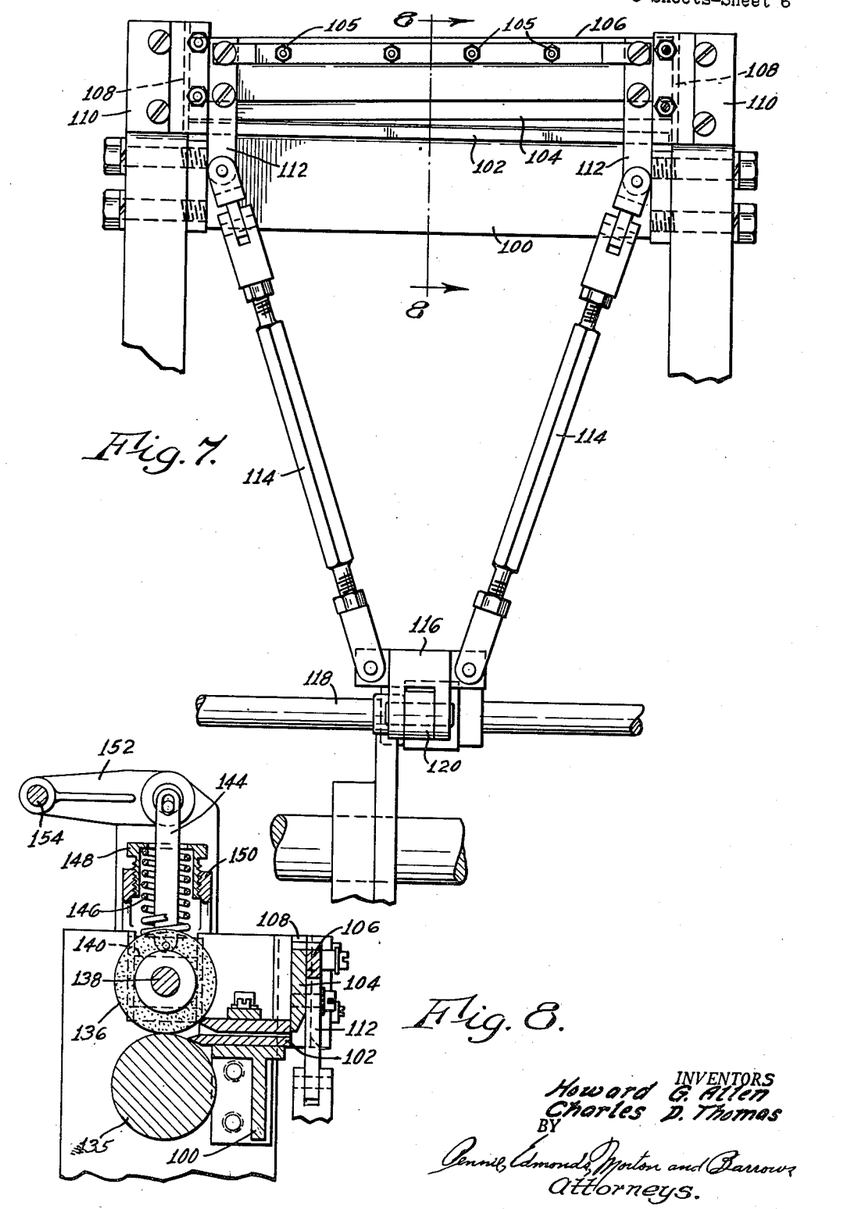
Fig. 7 is a detailed view of the cutting mechanism on line 7—7 of Fig. 4.
Fig. 8 is a vertical, sectional view on line 8—8 of Fig. 7.

Sheets of the proper length, equal to twice the circumference of the tube, are severed from the material M by cutting mechanism arranged beyond the feed rolls (see Figs. 4 and 8). The cutting mechanism includes a lower knife support 100 which is bolted to the frame of the machine and removably carries the lower knife blade 102. Upper knife blade 104 reciprocates in guide ways 108 formed in arms or brackets 110. A stiffener bar 106 is arranged adjacent the blade member. A series of set screws 105 are carried by this bar and engage the blade to crowd it against the edge of lower blade 102 throughout its full length. The upper knife member is arranged at an angle to the lower knife member and the cutting operation is effected by intermittent short downward strokes of the upper knife member, the cut being a shearing action. Adjacent each end of the support 106 of the upper knife member, an arm 112 is connected and these arms are in turn connected to adjustable pull rods 114. The lower ends of these rods are connected to a bracket or member 116 and this bracket is in turn pivoted at 118 (see Fig. 4) to a rocker arm or lever 120. The lever is in turn pivoted to the frame of the machine at 122. This lever carries a cam follower 124 which rotates on cam 126 carried by cam shaft 128. The cam is provided with a depression 130 and when the follower enters this depression, the mechanism is moved downwardly by a spring 132 to bring the upper knife blade 104 across the lower knife blade with a shearing action.

Figure 6:
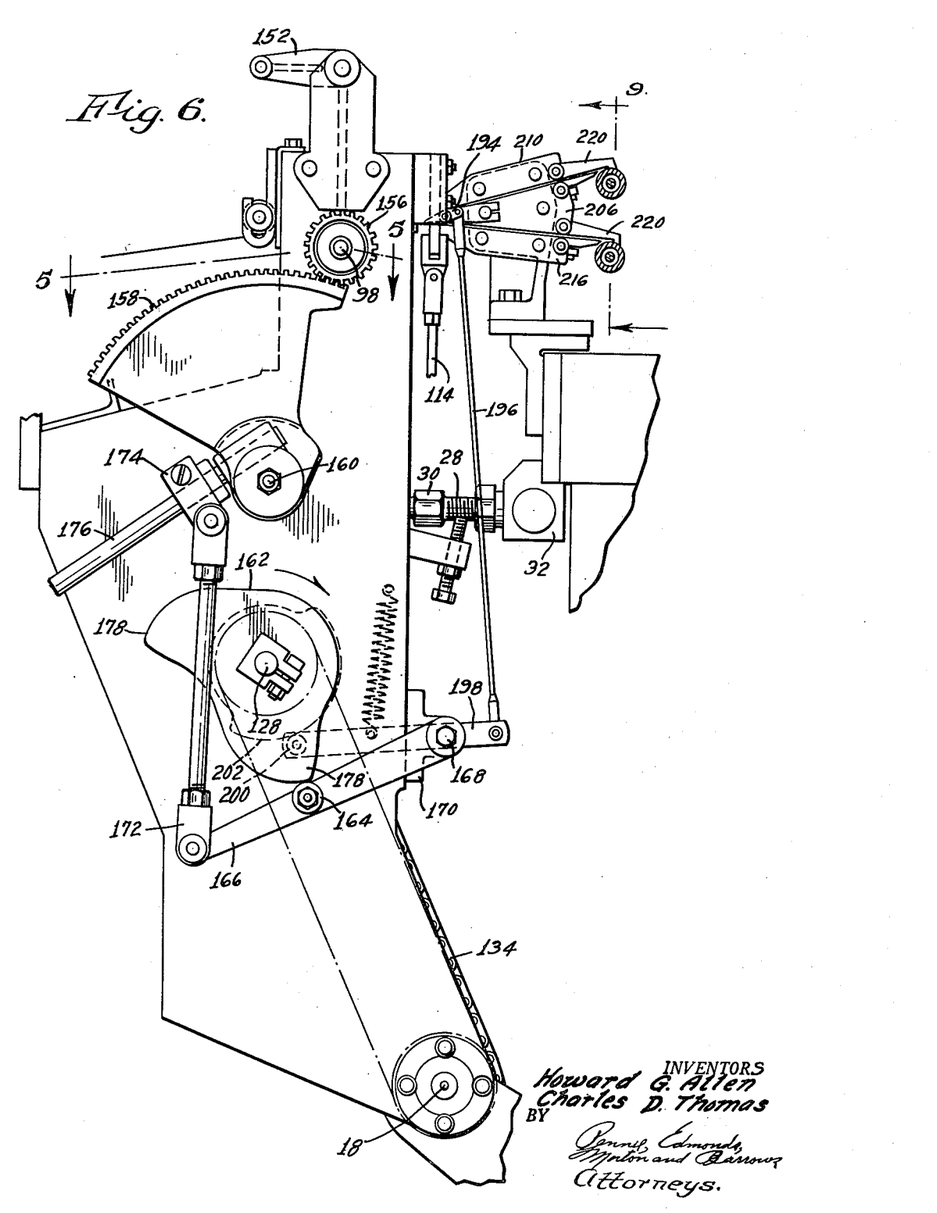
Fig. 6 is a side elevation of a portion of the machine showing the intermittent feed of the feed rollers.

Cam shaft 128 is driven from main shaft 18 by a chain 134 passing over sprockets on the two shafts (see Figs. 1 and 6).

*Sheet feeding mechanism*

Prior to the cutting operation, the sheet passes between the feed rolls. They consist of a lower roll 135 mounted on the shaft 98 and a plurality of rolls 136 having a surfacing of rubber or other resilient material mounted on a shaft 138. The shaft 138 is resiliently mounted to permit the rolls 136 to move away from the roll 135 to compensate for any unexpected increase in the thickness of the material or for any other reason. As shown, the shaft is mounted in bearings 140 slidable in guide ways in side frames 16. Links 144 are connected to these bearings and these links are surrounded by coil springs 146 which engage the bearing and, at their opposite ends, engage caps 148 threaded into lugs 150 on the brackets. The upper ends of the links are connected to levers 152 and these levers are in turn connected to a cross rod 154. The upper rolls can thus be released for feeding the material M when the machine is to be started, or for any other reason, by actuation of the cross rod 154.

The operation of the feed rolls is intermittent as heretofore stated. Shaft 98 of the lower roll is provided with a pinion 156 (see Fig. 6) and this pinion meshes with a sector gear 158 which is pivoted on the frame of the mechanism at 160. Shaft 128 is provided with a cam 162. This cam engages a follower 164 carried by a lever 166. The lever 166 is pivoted at 168 in a bracket 170 carried by the frame of the machine. The other end of the lever is connected to a link 172. This link is in turn connected to a clamp and nut structure 174 mounted on a rod 176 secured to the hub of sector gear 158. The cam 162 has two lobes 178. Engagement of either lobe with the cam follower 164 oscillates the sector gear 158. By adjusting the clamp and nut structure 174 on rod 176, the amount of rotation of sector gear 58 can be varied. This causes greater or lesser movement of the feed rolls and this causes a longer or shorter sheet to be fed.

When the sector gear is oscillated to rotate pinion 156 in a clockwise direction, the foil is fed. When the sector gear oscillates in the opposite direction, shaft 98 and its roll do not turn. This is accomplished by the one-way clutch shown in Fig. 5. Inner clutch member 180 is carried by the shaft 98. The outer clutch member 182 is connected to the pinion 156. A spring 184 is mounted on the end of the shaft and the spring may be adjusted by a nut 186 to vary the force exerted by it on the clutch.

*Sheet deflecting mechanism*

Figure 10:
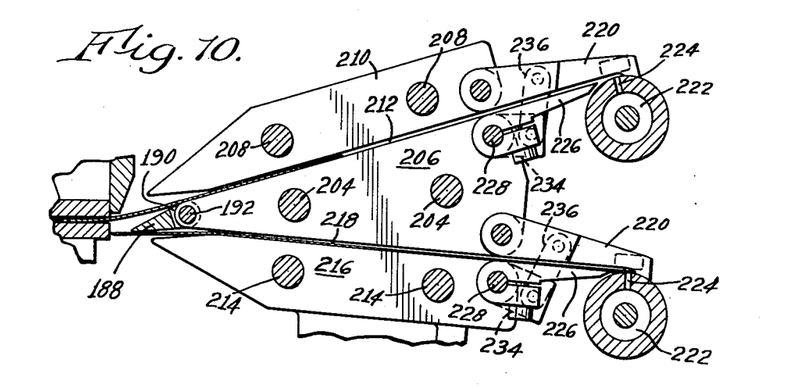
Fig. 10 is a vertical, sectional view on line 10—10 of Fig. 9.

The construction as heretofore described may be employed in a feed mechanism where the two dimensions of the sheet are to be controlled. As heretofore stated, the bonding machine, with which the feed mechanism is employed, comprises a pair of mandrels and the sheets are alternately fed to the mandrels. The deflecting mechanism, by means of which this is accomplished therefore constitutes a part of the invention but it will be apparent that when the cut sheets are to be delivered to a single member, the invention is capable of being used without the deflecting mechanism. After the material has been fed through the feed rolls and past the transverse cutter or knife, it passes over a triangular shaped deflector 188 which is capable of assuming either of two positions and which is slightly greater in length than the width of the material. The rear of the deflector is provided with ears 190 by means of which it is pivotally supported on rod 192. A rocker arm 194 (see Fig. 6) is connected to one end of the rod 192 and this rocker arm is in turn connected to a pull rod 196. The lower end of the pull rod is connected to a pivoted lever 198 having a cam follower 200 engaging a cam 202 on cam shaft 128. This cam has high and low concentric portions of about equal length and the forward edge of deflector 188 is thus lowered in one position of the cam to cause an approaching sheet S to be fed to the upper mandrel, and raised during the engagement of the follower and other section of the cam to elevate the deflector 188 and cause the material to be fed to the lower mandrel. Rearwardly of the rod 192 we provide a pair of rods 204 on which are supported spaced members 206 extending from a point immediately in the rear of the deflector. These spaced members are substantially triangular in shape as shown in Fig. 10. Above the members 206 we provide a pair of spaced rods 208 which support spaced members 210. The upper surfaces of the members 206 and the lower surfaces of the members 210 form a channel 212 for the delivery of sheets to the upper mandrel 2. We also provide a pair of spaced rods 214 beneath the members 206 and these rods support spaced members 216. The lower surfaces of the members 206 and the upper surfaces of the members 216 form a channel 218 for the delivery of sheets to the lower mandrel.

Figure 11:
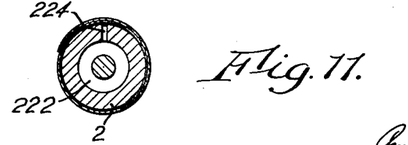
Fig. 11 is a sectional view of one of the mandrels showing the sheet material thereon.

At the rear of the members 206 and 210 we provide pivotally supported resiliently mounted fingers 220 which, as shown in Fig. 10, curve over the upper surfaces of the mandrels and yieldingly engage them. As shown, each of the mandrels is provided with an axial passage 222 which is adapted, in the cycle of operations, to be alternately connected to a source of suction and a source of pressure. The mandrels are also provided with radial passages 224 extending to the surface and when the sheet S is guided over the mandrel by the fingers 220, it is connected to the source of suction so that upon continued rotation of the mandrel, the sheet is wound about it as illustrated in Fig. 11 of the drawings.

Figure 9:
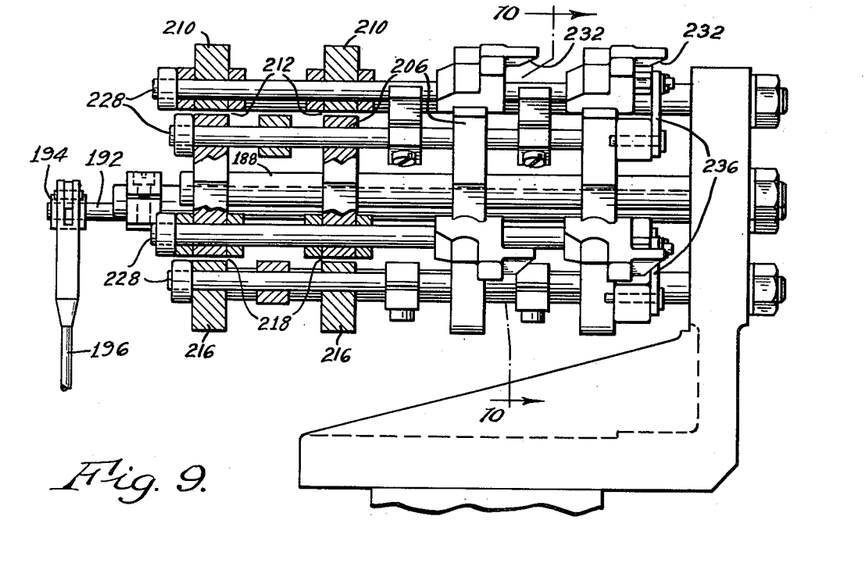
Fig. 9 is an end elevation, partly in section, of the mechanism by means of which the cut sheets are alternately fed to the two mandrels of the bonding machine.
Figure 12:
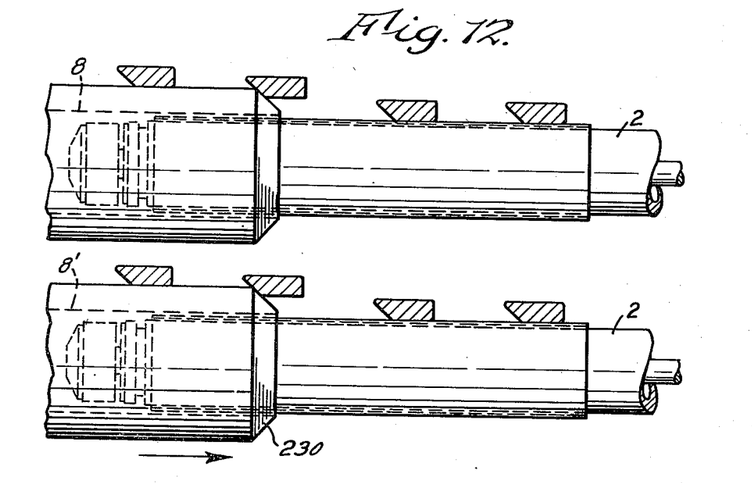
Fig. 12 is a side elevation showing the pair of mandrels entering the die and showing the release of fingers by means of which the sheet is fed over the mandrel.

Beneath each of the set of fingers 220 are sets of lower fingers 226 which cooperate with the fingers 220 to form continuation of the channels 212 and 218. These fingers are secured to rods 228 carried by the members 206 and 216, respectively. Means are provided for raising the fingers 220 as the cavities move over the mandrels. As shown in Fig. 12, a cam 230 is formed at the forward end of the cavities and each of the fingers is provided with a cam 232 (see Fig. 9) which is engaged by the cam surface 230 to raise the finger. Rods 228 are provided with arms 234 which are connected to the first finger 220 to be engaged by the cavities by links 236. Thus, when the first of the upper fingers is raised by the carriage, the entire set of lower fingers 226 is also raised to avoid interference of these fingers with the cavities.

An advantage of the provision of the pivoted fingers as heretofore described is that if a section of foil is not properly fed to the mandrel or is only partly wound on the mandrel, the lifting of the fingers lifts the foil so that it will pass clear of the outer surface of the cavities and thus avoid being crumbled and jamming the mechanism. It also permits the operator to more readily reach between the fingers to remove a sheet S which is not properly wound on the mandrel.

*Index control and edge register control*

Figure 13:
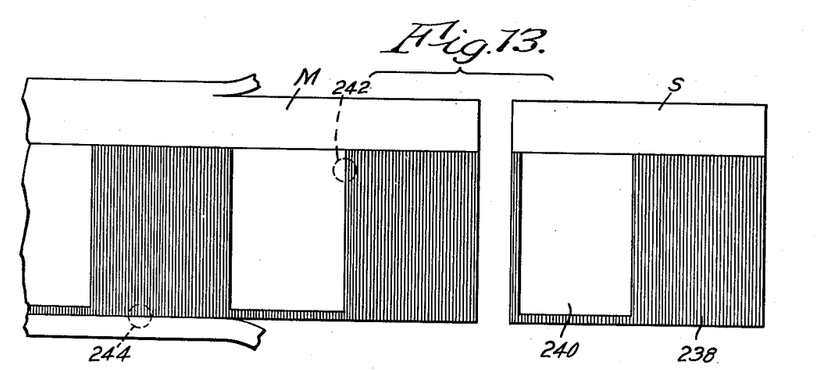
Fig. 13 is a view of the sheet material illustrating a design or printing and showing one cut sheet.

As stated, the sheets S are formed from material M which is slightly wider than the length of the embryo tube produced in the bonding machine. The trim removed from each side of the sheet must be accurately cut. In addition, it is necessary that the shearing of the sheets be properly indexed to position the printed matter on the finished tube. As the finished tube is formed of two layers of the sheet material, the printed matter 238 on the roll material is spaced from the next printed matter by an unprinted section 240 (see Fig. 13). It is necessary that the transverse shearing be performed at the right end of a printed section, as shown in Fig. 13, and that the side trimming on the one side occur at the bottom of the printed section. For this purpose we provide a pair of photo-electric cells 242 and 244, the first as an index control to control the transverse cutting, and the second for the purpose of controlling the side trimming. The positions of these photo-electric cells is shown in Figs. 2 and 3 of the drawings. As shown, the cell 242 is mounted on a bracket 246 secured to the frame of the machine and the bracket also supports a back-up plate 248 over which the material M passes.

Photo-electric cell 244 is carried by a bracket 250 having a lug 252 with a threaded opening therein. A threaded rod or shaft 254 passes through the threaded opening and is supported in the side members 10. This rod is provided with a hand wheel 256 at one end. The cell 244 may, therefore, be adjusted laterally of the machine so that a definite point in the design becomes one end of the embryo tube. Back-up plate 258 is supported by the frame members 10 and the material M passes over this back-up plate at the time that it is in focus with the photo-electric cell.

Figure 14:
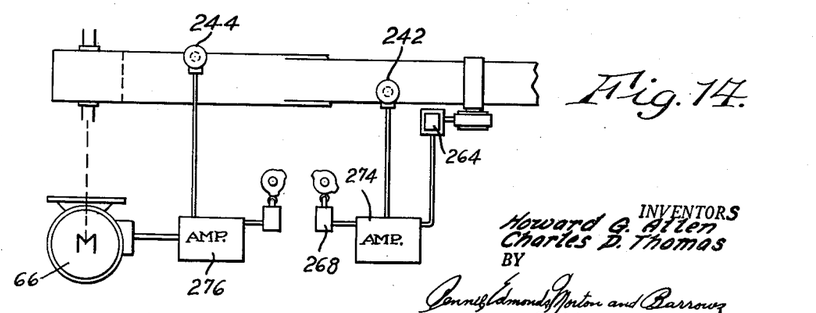
Fig. 14 is a diagrammatic view of the controls by means of which the side and ends of the cut sheets are properly registered.

The mechanism which controls the automatic adjustment of the fed material through the photo-electric cells is illustrated diagrammatically in Fig. 14 of the drawings and the cams and other mechanism associated therewith are shown in Fig. 4. As shown in Fig. 4, a pair of brake bands 260 are associated with the lower feed roll shaft 98 and are provided with friction facings 262 to engage the brake drum 263. A solenoid 264 is mounted on the machine and is connected to the ends of the brake bands by an arm 266. A normally open switch 268 is connected in the circuit of solenoid 264 and this switch is closed by cams 270 carried by a cam wheel 272 on the shaft 128.

Referring to Fig. 14 of the drawings, switch 268 is connected to a set of blocking contactors in amplifier box 274. Prior to approach of a printed registry mark on material M (Fig. 13), one of the lobes 270 of cam 272 closes this switch. The cell 242 then energizes solenoid 264 to apply the brake to shaft 98 when the registry mark enters the light beam. A friction clutch comprising discs 273 and 275 (Fig. 5) permits further travel of sector gear 158 without transmitting the movement to shaft 98. Just prior to the start of the next feed of sheet M, switch 268 is opened by cam 272. Solenoid 264 is thus deenergized, releasing the brake and permitting cam 162 to rotate shaft 98.

The side registry photo-electric cell 244 is also connected to an amplifier 276 and to motor 66. A switch 278 is also provided to cut out the photo-electric cell 244. This switch is controlled by a cam 280 mounted on the cam shaft 128. In practice it has been found that when the portion of the material M containing the blank spaces 240 is passing the photo-electric cell 244, there is insufficient contrast in color to make this cell effective. Switch 278 thus cuts out the photo-electric cell during those periods of time. This switch is operated by cam 280 on cam shaft 128.

The necessity for the side register, once a roll of material has been properly started through the machine, is due primarily to the fact that the rolls are not always evenly wound. When material is unwound from the roll which, in the absence of photo-electric cell 244, would result in improper trimming of the side edges, the photo-electric cell causes the motor 66 to be energized, rotating the threaded shaft 60 and shifting the entire roll support laterally until it is brought into proper registry.

We claim:

1. A device to guide alternately fed sheets delivered thereto in different paths to a pair of spaced mandrels comprising an oscillating rod extending transversely of the path of travel of the sheets, a triangular shaped deflector mounted on the rod and adapted to be moved to either of two positions by the oscillation of the rod, supporting rods arranged beyond the deflector, a plurality of triangular shaped members mounted on the rods, a second set of supporting rods mounted over the first set of supporting rods, spaced members mounted thereon, the adjacent edges of the triangular members and the spaced members forming a channel for the passage of sheets and leading to one mandrel, another set of supporting rods arranged beneath the first set of supporting rods, and spaced members mounted thereon, the adjacent edges of the last mentioned spaced members and of the triangular shaped members forming a second channel for the passage of sheets and leading to the other mandrel, the deflector being arranged to guide the fed sheets alternately into said channels when it is oscillated.

2. Apparatus in accordance with claim 1 in which pivotally supported spring-pressed fingers are mounted at the rear of the channels and form continuations thereof.

References Cited in the file of this patent

UNITED STATES PATENTS

| | | |
|---|---|---|
| 994,998 | Harbeck | June 13, 1911 |
| 1,740,844 | Strout | Dec. 24, 1929 |
| 1,850,932 | Holms | Mar. 22, 1932 |
| 1,896,375 | Roesen | Feb. 7, 1933 |
| 2,006,040 | Crane | June 25, 1935 |
| 2,078,669 | King | Apr. 27, 1937 |
| 2,249,820 | Gulliksen | July 22, 1941 |
| 2,299,984 | Horwitz | Oct. 27, 1942 |
| 2,300,906 | Bronson | Nov. 3, 1942 |
| 2,526,916 | Turrall | Oct. 24, 1950 |
| 2,563,492 | Turrall | Aug. 7, 1951 |